Patented Mar. 7, 1950

2,500,092

UNITED STATES PATENT OFFICE 2,500,092

LEACHING OF BATTED RESIN BONDED GLASS FIBERS

Leon Parker, Glendale, and Bonnie Jean Zack, Compton, Calif., assignors to The H. I. Thompson Company, Los Angeles, Calif., a corporation of California No Drawing. Application June 21, 1948, Serial No. 34,354

6 Claims. (Cl. 41—42)

This invention relates to resin bonded glass fibers, and to an improvement in the process of treating glass fibers with acids for the purpose of extracting the glass-forming oxides, other than silica, in order to produce fibers of very high silica content, containing little or substantially no other glass-forming oxides, to produce a siliceous fiber of very high melting point and approaching, in character, silica fibers.

It has been found possible to treat glass fibers with dilute acids, such as hydrochloric, sulfuric, nitric, acetic, chloro acetic or trichloroacetic acid and to extract from the glass the glass-forming oxides other than silica and to produce a glass material containing from 90% or more silica and as high as 99% silica at melting points in excess of from above 1500° F. and as high as 3000° F.

The procedure employed is to immerse the batted fibers in an acid solution (such as referred to above) and to carry the extraction forward until substantially all of the glass-forming oxides, other than silica, are withdrawn. The extraction can be obtained by adjusting the temperature, time, and concentration of the acid for such purpose.

A convenient form of acid is HCl and it has been found that acid strengths of from 10–15% and temperatures ranging from about 150–190° F. and time ranging from 4–24 hours will produce useful results.

The glass fibers employed are those which are not chemically resistant. They include the high alumina, high lime, relatively low boron oxide, boro-silicate glasses. A typical example (cited only for illustration) is given by the following analysis:

| | Per cent |
|---|---|
| $SiO_2$ | 53.04 |
| $Al_2O_3$ | 15.72 |
| $Fe_2O_3$ | .36 |
| CaO | 15.43 |
| MgO | 4.48 |
| $B_2O_3$ | 10.65 |
| | 99.68 |

After the glass fiber batt has been treated it is removed and washed and fired at about 1400–1750° F. to burn off the resin and dehydrate the fiber. One of the major uses for such fibers is in batted form in which the fibers are in interlocked arrangement, rather closely packed in random arrangement. The nature of the batt appears from the following:

| | Batt | Cloth |
|---|---|---|
| Thickness, Inches | .14–.25 | .015 |
| Approximate Surface Density, Lbs./sq. ft | .05 | .07 |
| Fiber Diameter, Inches | .00020 to .00040 | .00020 to .00035 |
| Fusing Temperature, °F | 3,100 | 3,100 |
| Approximate Moisture Content, Per Cent | 1.0 | 1.0 |
| Approximate Moisture Pick-up, Per Cent [1] | 1.0 | 1.0 |
| Shrinkage in Area on Exposure to 2000° F., Per Cent | 2.0 | 5.0 |
| Specific Heat | .19 | .19 |
| Refractive Index ($N_D$) | 1.478 | 1.478 |

[1] 70° F., 60% R. H.

The fired, acid extracted batt may have the following composition, this formulation being typical and not any limitation upon the nature of the fibers produced:

| | Per cent |
|---|---|
| $SiO_2$ | 98.59 |
| $Al_2O_3$ and $Fe_2O_3$ | 1.07 |
| CaO | .24 |
| | 99.90 |

While it is possible in producing such batts to treat batted glass fibers, they tend to become lumpy and mushy and disintegrate due to the handling of the batt during treating, washing, drying, and firing.

One of the major uses of these batted materials is in insulation to form insulating blankets, in which case it is desirable to maintain the porosity of the batt and to reduce the fragmentation of the fibers. It is therefore desirable that the original shape of the batt be preserved during treatment.

It has therefore been found desirable to employ batts whose fibers have been bonded with resin. This form of batted glass fibers is well known.

The resins employed are well known and usually considered to be acid resistant, water impervious resin coating compositions. It has been found, however, that the films with which the fibers are coated do not constitute a barrier to the penetration of acid or the diffusion of the salts formed on leaching. The fibers are leached without destruction of the bonding resin films. These films act as a protective coating to increase the strength and reduce the brittleness of the fibers and the batts and also preserve the shape of the batt during treatment.

Various resins may be employed as bonding agents. Thus, the following resins have excellent acid resistant properties: phenol-formaldehyde; phenol-furfural; polyvinyl chloride; vinylidene chloride; polystyrene; polyethylene; and polybutylene; methylmethacrylate; lignin and rubber and chlorinated rubber. Of the above resins, the phenol-formaldehyde, phenol-furfural, methylmethacrylate resins are attacked by the strong oxidizing acids, such as strong sulfuric acid and strong nitric acid, while the others are not so attacked. The permeability of the resin film to water is greatest in the case of the phenol-formaldehyde, phenol-furfural, and methylmethacrylate resin, and least in the case of the polyvinyl chloride, vinylidene chloride, polystyrene, polyethylene, and the rubbers. In order to cut down the time of leaching, it is preferable to employ the acid resistant and highly permeable resins, such as the phenol-formaldehyde, phenol-furfural, and methylmethacrylate resins, and employ the non-oxidizing acids when using such resins.

In carrying out this process the batts are immersed in the acid solution at an elevated temperature and maintained in this acid for a period of time. As a practical operation a number of such batts are placed on top of each other on racks in tanks containing the acid and then the racks are removed from the acid upon completion of the extraction and washed in wash tanks for removal of the excess acid. The batts are then rolled up and placed into a drying oven to remove the superficial moisture by heating them for several hours at a temperature of about 180° F. and then they are placed in furnaces where they are heated at 1600° F. for nine hours to burn off the resinous material and to dehydrate the silica fibers.

It has been found that in this operation the ends of the batts are brittle and discolored. Their color varies from white to black, and no degree of firing and no prolongation of the firing can burn out the black material. Apparently the black color, which may be carbonaceous material, is sealed inside the fiber. It has therefore been necessary, because of the discolored and brittle ends, to cut off the ends and discard them and a considerable loss is thus entailed. In fact, the theoretical loss due to extraction and shrinkage on dehydration amounts to about 40%, and it has been found, as a practical matter, that the additional loss in the discarding of the brittle ends can raise the total loss to as high as 65%.

We have discovered that the difficulty can be cured by wrapping the resin bonded batt before treatment with a porous diaphragm which is permeable to the acid and is resistant to acid attack. This is done by rolling the resin bonded batt into a roll and then rolling the roll inside of the blanket to completely cover the batt. The blanket should preferably extend to the ends and also may extend beyond the ends of the roll. The roll ends need not be covered, although this is not an undesirable procedure. Thus, the batt may be enclosed inside a foraminous blanket and immersed in the acid solution. The acid permeates the blanket and causes the extraction and the wrapped batt may then be washed without removing the foraminous blanket to remove the acid and may then be dried, preferably below the fusion temperature of the resin binder. Unstable temperature is from 100–200° F. The batt may then be removed from the covering blanket and fired.

We may employ any suitable sheet material which is chemically resistant, but permeable, to the acid and has sufficient structural strength to be used as a blanket. For example, we may use a previously extracted and fired silica fiber cloth or batt. We may employ acid resistant fiber glass cloth. We may use foraminous sheet rubber which contains a multiplicity of fine holes, such as is used for the filtration of corrosive acid material. If the temperature used in acid leaching is not too excessive (i. e., in the range of 100 to 200° F.) we may use either a polyvinylidine resin woven cloth or such cloth of suitable resinous textile material which is resistant to acid.

We find, however, that a satisfactory wrapping is formed of the resin bonded glass fiber material which is employed as raw material for extraction. In order to prepare such a material for use in the process to increase the structural strength and its resistance to acid attack, we coat the batt of resin bonded glass fibers heavily with a rubber sheath by spraying the batt with a latex of said rubber. We may employ for this purpose either ordinary rubber latex or may employ a synthetic rubber elastomer latex such as chloroprene or butadiene or isoprene rubber latex. We prefer to use the chloroprene latex. The batt when so covered with the latex is then cured at about 200° F. for approximately one-half hour to cut down the adhesive qualities of the latex, in order to prevent the latex from softening in the treatment operation or during the subsequent drying-out operation and to prevent the wrapped rolls from sticking to each other. We also find that the dusting of the latex covered batt, before wrapping of the batts to be extracted, with talcum powder or any other fine powdered material will cut down the tendency of the latex covered batt to stick to any surface coming in contact therewith.

We also find that a highly useful wrapping may be a sheet of chemically resistant glass fiber cloth. Such cloths have been used as filter cloths in ordinary filtration of acid liquors. This glass cloth may be generally defined as a low alumina, high lime, low boron-boro-silicate glass, in contradistinction to the high alumina, high lime, low boron-boro-silicate employed for extraction of the glass.

A typical analysis of the glass used in the fiber of the sheet material is as follows:

| | Per cent |
|---|---|
| $SiO_2$ | 63.4 |
| $Al_2O_3$ | 6.39 |
| $Fe_2O_3$ | .36 |
| CaO | 13.55 |
| Mg | 2.29 |
| $B_2O_3$ | 6.96 |
| NaO | 5.88 |

In employing such a blanket we roll the resin bonded batt to be extracted into a roll and then roll the roll inside the blanket. We immerse several of such rolls into a tank containing hydrochloric acid of about 13% strength and allow the digestion to proceed at a temperature of about 170° F. for a period of 6–24 hours. The rolls while still inside their blanket are removed from the acid solution, still wrapped, and washed to remove substantially all of the acid. The rolls are placed in a drying oven where they are dried at a temperature of about 180° F. to remove superficial moisture. The batts are unrolled from their blankets and wrapped with an interliner of Kraft paper and introduced into an oven where they are fired to burn off the paper, resin binder, and dehydrate the silica, as previously described.

As a result of this treatment we have substantially completely eliminated the tendency of the ends of the batts from becoming brittle and have eliminated the blackening thereof, the batts after firing being of uniform quality and pure white throughout.

We have thus been able to reduce the loss from 65% to about 45%; that is, we have reduced it to substantially the theoretical value.

While we have described a particular embodiment of our invention for the purpose of illustration, it should be understood that various modifications and adaptations thereof may be made within the spirit of the invention as set forth in the appended claims.

We claim:

1. A process of forming batts of silica fibres, which comprises, forming a roll of resin bonded glass fibre batt, wrapping said roll in an envelope of an acid resistant and acid permeable sheath, immersing said wrapped roll in a solution of an acid for a time sufficient to extract the glass forming oxides, other than silica, of said roll, removing said roll from said envelope, and heating said extracted fibres to an elevated temperature sufficient to dehydrate said batt and remove said resin.

2. A process of forming batts of silica fibres, which comprises, forming a roll of resin bonded glass fibre batt, wrapping said roll in an envelope of an acid resistant and acid permeable sheath to cover the said roll, immersing said wrapped roll in a solution of an acid for a time sufficient to extract the glass forming oxides, other than silica, of said roll, washing said rolled batt while in said envelope to remove excess acid, removing said roll from said envelope, and heating said extracted fibres to an elevated temperature sufficient to dehydrate said batt and remove said resin.

3. A process of forming batts of silica fibre, which comprises coating a batt of glass fibres with rubber latex to coat said batt with rubber, forming a roll of resin bonded glass fibre batt, and enclosing said roll in said rubber coated batt to cover the said roll, immersing said wrapped roll in a solution of an acid, extracting the glass forming oxides, other than silica, of said roll, removing said roll from said enclosing latex covered batt, and heating said extracted fibres to an elevated temperature sufficient to dehydrate said batt and remove said resin.

4. A process of forming batts of silica fibre, which comprises coating a batt of glass fibres with rubber latex to coat said batt with rubber, forming a roll of resin bonded glass fibre batt and enclosing said roll in said rubber coated batt, immersing said wrapped roll in a solution of an acid, extracting the glass forming oxides, other than silica, of said roll, washing said rolled batt while enclosed in said rubber coated batt to remove excess acid, removing said roll from said rubber coated batt, and heating said extracted fibres to an elevated temperature sufficient to dehydrate said batt and remove said resin.

5. A process of forming batts of silica fibre, which comprises coating a batt of glass fibres with rubber latex to coat said batt with rubber, curing said rubber coating, forming a roll of resin bonded glass fibre batt and enclosing said roll in said rubber coated batt to cover the said roll, immersing said wrapped roll in a solution of an acid for a time sufficient to extract the glass forming oxides, other than silica, of said roll, removing said roll from said enclosing latex rubber coated butt, and heating said extracted fibres to an elevated temperature sufficient to dehydrate said batt and remove said resin.

6. A process of forming batts of silica fibre, which comprises, coating a batt of glass fibres with rubber latex to coat said batt with rubber, curing said rubber coating, forming a roll of resin bonded glass fibre batt and enclosing said roll in said rubber coated batt, immersing said wrapped roll in a solution of an acid for a time sufficient to extract the glass forming oxides, other than silica, of said roll, washing said rolled batt while in said enclosing rubber coated batt to remove excess acid, removing said roll from said enclosing batt, and heating said extracted fibres to an elevated temperature sufficient to dehydrate said batt and remove said resin.

LEON PARKER.
BONNIE JEAN ZACK.

REFERENCES CITED

The following references are of record in the file of this patent:

UNITED STATES PATENTS

| Number | Name | Date |
|---|---|---|
| 2,124,330 | Pascoe | July 19, 1938 |
| 2,146,870 | Whiteley | Feb. 14, 1939 |
| 2,184,316 | Plummer | Dec. 26, 1939 |
| 2,184,320 | Simpson | Dec. 26, 1939 |
| 2,311,704 | Simison | Feb. 23, 1943 |
| 2,375,585 | Rimer | May 8, 1945 |